United States Patent [19]

Schmidt et al.

[11] Patent Number: 4,578,198

[45] Date of Patent: Mar. 25, 1986

[54] SEWER AND CATCH BASIN CLEANING SYSTEM

[75] Inventors: Ronald L. Schmidt; Roland E. Shaddock, both of Streator, Ill.

[73] Assignee: Peabody Myers Corporation, Streator, Ill.

[21] Appl. No.: 564,848

[22] Filed: Dec. 23, 1983

[51] Int. Cl.$^4$ .................................................. B01B 33/00
[52] U.S. Cl. ...................... 210/780; 210/805; 210/241; 210/516; 134/10; 134/22.12; 134/167 C
[58] Field of Search ............... 210/402, 409, 780, 800, 210/29, 297, 299, 805, 241, 167, 316, 791, 792; 15/302; 134/167 C, 22.12, 10

[56] References Cited

U.S. PATENT DOCUMENTS

| | | | |
|---|---|---|---|
| 3,064,813 | 11/1962 | Smith | 210/297 |
| 4,134,174 | 1/1979 | Flynn et al. | 15/302 |
| 4,234,980 | 11/1980 | DiVito et al. | 15/302 |
| 4,377,475 | 3/1983 | Wiedemann | 210/409 X |
| 4,389,314 | 6/1983 | Petretti | 210/241 |

Primary Examiner—Richard V. Fisher
Assistant Examiner—Sharon T. Cohen
Attorney, Agent, or Firm—Kirkland & Ellis

[57] ABSTRACT

A mobile sewer and catch basin cleaning vehicle dislodges and removes debris in a conventional manner. The dislodged debris is then conveyed into a debris-receiving compartment where it undergoes a two-stage filtration process. The first stage removes the coarser debris from the reclaimed contaminated water. The second stage filters out the finer particulate debris by drawing such water through a finely filtered media surrounding a rotating drum. This filtered reclaimed water is then re-used in the cleaning operations. The extremely fine filtration media is continually cleaned by small amounts of clean water being applied at high pressure through nozzles designed to spray the entire media area as the drum rotates.

20 Claims, 4 Drawing Figures

SEWER AND CATCH BASIN CLEANING SYSTEM

BACKGROUND OF THE INVENTION

1. Field of the Invention

The present invention relates to an apparatus and method for cleaning sewers and catch basins, and, more specifically, to a mobile sewer and catch basin cleaner which continuously filters reclaimed water so that such water may be reused in the cleaning process.

2. Description of the Prior Art

Certain types of mobile catch basin and sewer pipe cleaners are known in the art. For example, in Shaddock, U.S. Pat. No. 3,658,589, entitled "Catch Basin and Sewer Pipe Cleaner", water stored in a clean water reservoir in the vehicle is injected at high pressure into sewer laterals (or sewer lines). The water is discharged through nozzles which backwash the dislodged debris into a manhole. A vacuum system then pneumatically conveys the debris-laden water into a debris collection chamber. However, the Shaddock reference does not teach the reuse of reclaimed water in the cleaning process and the water reservoir disclosed therein must be frequently refilled with clean water to continue the cleaning operation.

Some sewer cleaning systems employ centrifugal cleaning methods to filter and recycle the reclaimed water so that it may be reused in the sewer cleaning operation. In Flynn, et al., U.S. Pat. No. 4,134,174, entitled "Sewer and Catch Basin Cleaner", such a recycling system is disclosed. After the coarser debris material is filtered out of the contaminated water by the forces of gravity, the contaminated water is then filtered through a cylindrical screen. This water is then further cleaned through a centrifugal particle separator before being introduced back into the vehicle's clean water reservoir. This system has several disadvantages, however. First, introducing the reclaimed water back into the clean water reservoir raises the substantial likelihood that any debris remaining in the reclaimed water will corrode the reservoir. Further, such contaminated water may unnecessarily create a potential health hazard to persons, such as system operators and mechanics, who come into contact with the clean water reservoir.

Second, the cylindrical screen in Flynn is cleaned by an air-blowing system to attempt to remove any obstructions in the screen pores. However, the screen is wholly submerged in the debris-laden water and, consequently, such an air cleaning system is highly inefficient because it must displace not only all of the contaminated water surrounding the screen, but also the particulate matter clinging to the screen in order to clean the screen. Additionally, this air cleaning system has substantial difficulty cleaning fine-mesh screen media, and therefore, typically can only be applied to screens with larger openings, such as the 790 to 5550 micron screens suggested in the Flynn disclosure. Using such larger screens obviously results in a greater amount of particulate matter not being filtered out.

Third, centrifugal cleaning systems disclosed in the prior art, including that described in Flynn, do not work effectively under all conditions. For example, sufficiently greasy water will clog the underflow of the centrifuge, thereby rendering the centrifugal cleaning system inoperative. Moreover, such centrifugal systems typically are ineffective when attempting to filter water having a large concentration of particulate matter. Last, centrifugal separation cannot filter out particulate matter which is less dense than water.

In contrast, as discussed below, it is a principal object of the present invention to provide a novel apparatus and process for recycling reclaimed water into the cleaning process without the foregoing disadvantages of the prior art.

Another object of the present invention is to provide an improved process for recycling the water reclaimed from a sewer or catch basin for use in further sewer or catch basin cleaning operations.

It is a further object of the present invention to provide such a process which works effectively under all the conditions routinely encountered when cleaning sewers and catch basins.

It is yet a further object of the present invention to provide an apparatus and process which permits the operator to remain at the cleaning site throughout the cleaning operation and without the need for continually refilling the clean water reservoir.

These and other objects of the present invention are presented by way of illustration and not limitation, and are fully described with reference to the drawings and the following detailed description of a preferred embodiment of the present invention.

SUMMARY OF THE INVENTION

The present invention comprises a mobile catch basin and sewer cleaning system and the method of use thereof. The system includes a mobile cleaning vehicle equipped with a high-pressure, flexible hose communicating with a reservoir of clean water carried in a tank on the vehicle. The vehicle also includes a partitioned debris collection compartment. The forward portion of the compartment (when viewed from the back of the vehicle to the front) is provided with a perforated drum which is surrounded by an extremely fine filtration media. The inner cavity of the drum includes a series of nozzles which are arranged to direct a spray of water to the inner surface of the filtration media as the drum rotates, an input conduit to provide water under pressure to the nozzles, and an output conduit adapted to withdraw the filtered water from the debris collection compartment.

The perforated drum is attached to the front wall of the debris compartment by a rotating joint which permits the drum to be rotated by an external drive means. Additionally, this joint seals the debris within the debris compartment, and maintains the water input conduit and the filtered reclaimed water output conduit, both of which extend therethrough and into the drum, in a stationary fashion while the drum rotates.

In the method of the present invention, the flexible hose is lowered into a manhole and directed up a sewer lateral or line. Water from the water reservoir or from the debris collection compartment is directed from a high-pressure water pump to propel the hose up the sewer lateral. The end of the hose is provided with a nozzle which backwashes the dislodged debris into the manhole. The water and dislodged debris are then removed from the manhole by conventional vacuuming techniques and conveyed into the partitioned debris collection compartment.

The coarser debris settles into the rearward portion of the debris compartment and water containing the less dense debris is filtered through the perforated drum.

This filtered water is then reused in the sewer cleaning process.

The perforated drum is continuously cleaned by directing streams of water at high pressure to the fine filtration media surrounding the drum, and results in removing any debris adhering to the media.

BRIEF DESCRIPTION OF THE DRAWINGS

FIG. 4 illustrates the water-level measuring device used in assocation with the present invention.

DESCRIPTION OF THE PREFERRED EMBODIMENT

Figure 1:
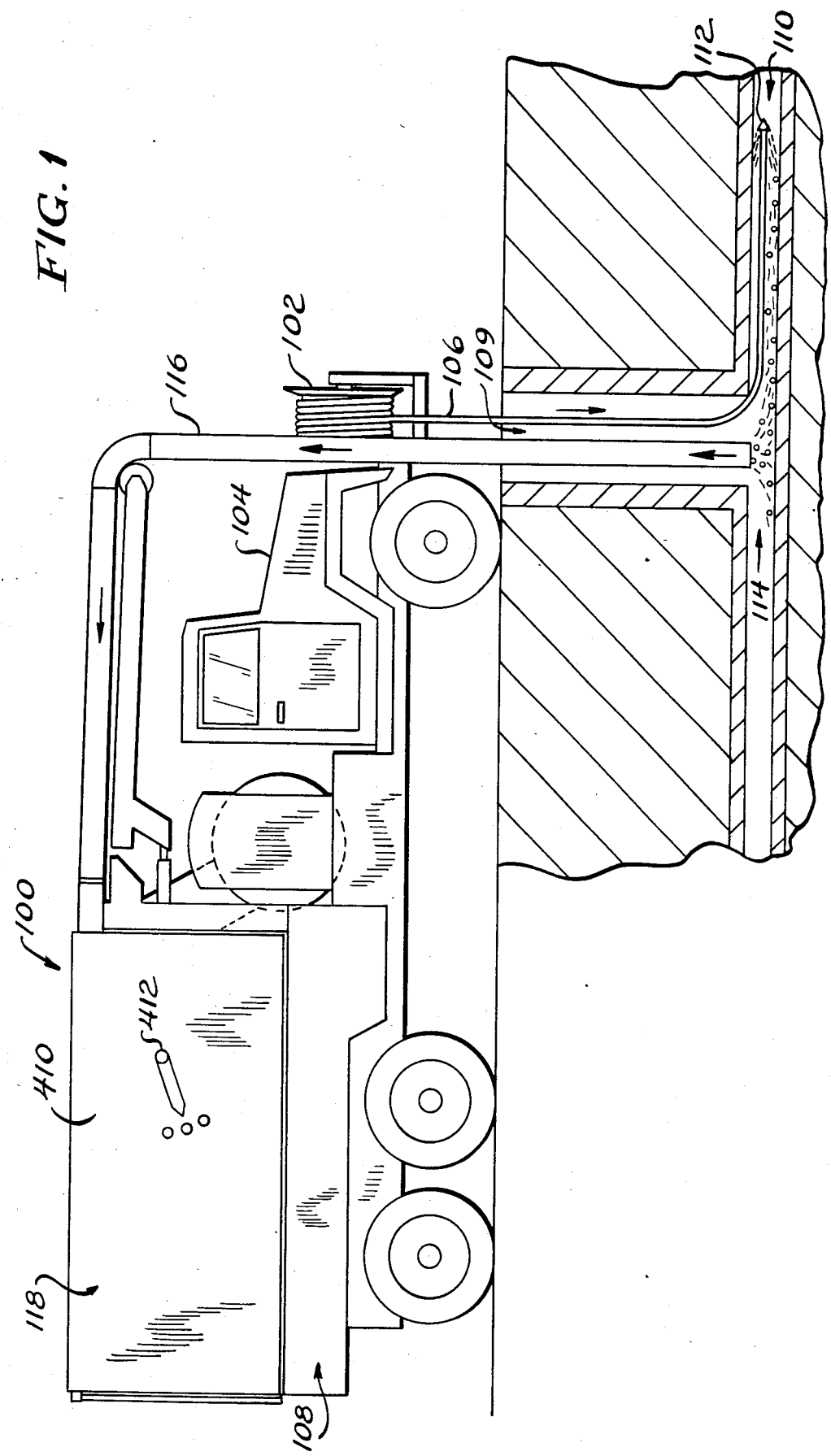
FIG. 1 is a partial cross-section, side view of the sewer and catch basin cleaning vehicle into which the preferred embodiment of the present invention may be placed.

FIG. 1 illustrates the sewer and catch basin cleaning vehicle 100 of the present invention. In the preferred embodiment, a hose reel 102 is mounted adjacent a cab 104, and a high-pressure, flexible hose 106 is wound upon the reel 102. Water is supplied to the hose 106 from a clean water reservoir 108 (or a debris compartment 118 as discussed below) by means of a high-pressure water pump 216 (see FIG. 2).

In operation, a portion of the hose 106 is lowered through a manhole 109 and directed into a sewer lateral 110. Water pressurized by the water pump 216 propels the hose 106 through the lateral 110 by means of a self-propelling nozzle 112. The nozzle 112 has a plurality of water jets which are oriented both to propel the nozzle 112 and the hose 106 forwardly through the sewer lateral 110 and to flush the sewer lateral 110 by directing debris 114 backwardly towards the manhole 109. Water emitted from the water jets of the nozzle 112 is directed generally from the nozzle 112 toward the manhole 109, and the water thus flowing toward the manhole 109 includes debris 114 (such water being hereinafter referred to as "contaminated water"). The contaminated water and debris 114 are then removed from the manhole 109 by conventional vacuuming techniques and transported via a conduit 116 into the debris compartment 118 associated with the cleaning vehicle 100.

Figure 2:
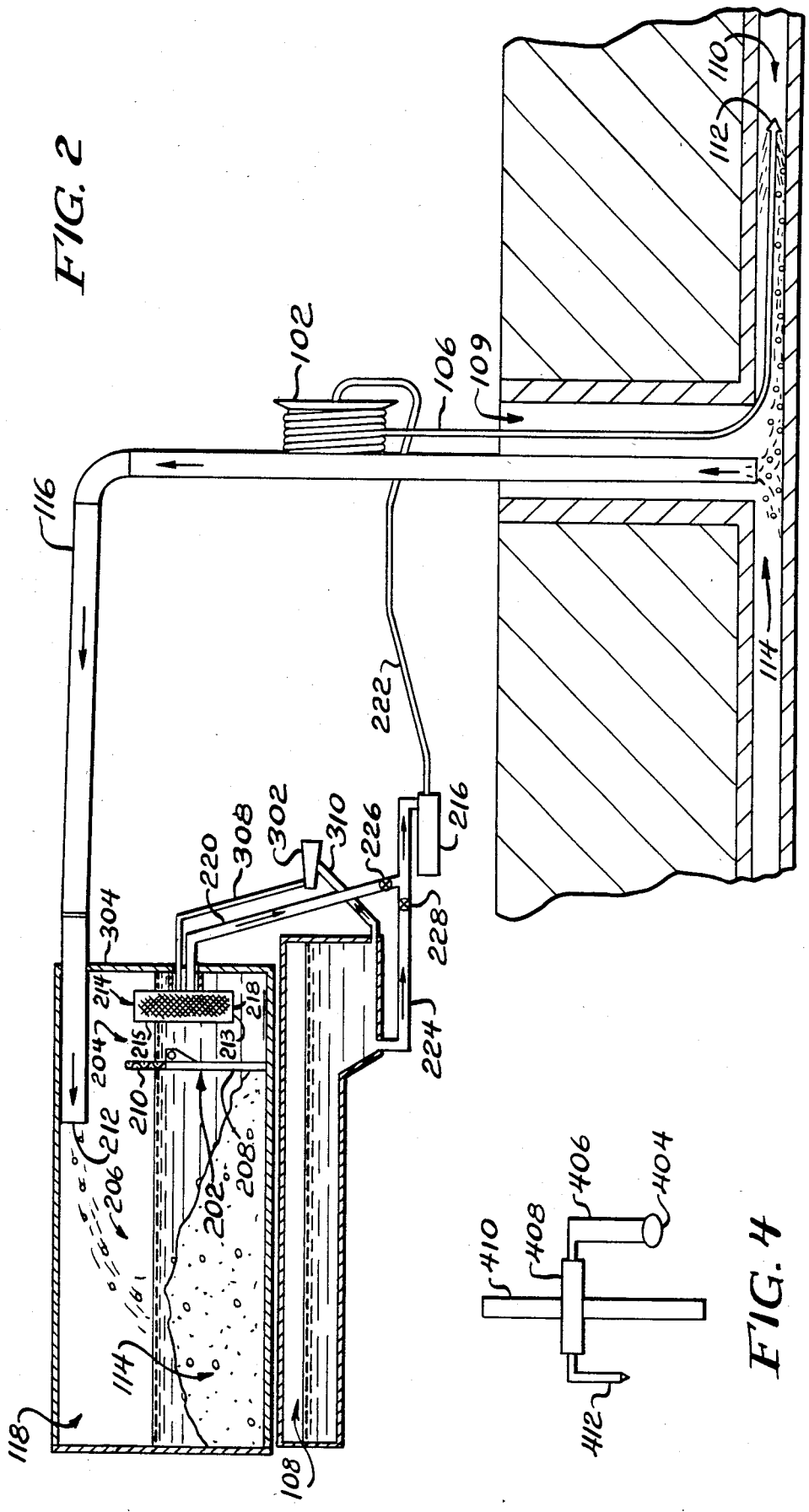
FIG. 2 is a view similar to FIG. 1, with certain parts cut away to illustrate more clearly the water reclamation and filtration system of the present invention.

FIG. 2 illustrates the water reclamation and filtration apparatus of the present invention. In the preferred embodiment, the filtration of the contaminated water and debris 114 occurs in two stages. It is understood that additional filtration stages can also be employed.

The first filtration stage is a coarse filtration process. A partition 202 divides the debris compartment 118 into a forward section 204 (when viewed from the back to the front of the vehicle 100 depicted in FIG. 1) and a rearward section 206. The partition 202 is comprised of a substantially solid lower portion 208 and a coarse-screening upper portion 210. In the preferred embodiment, the upper portion 210 of the partition 202 is comprised of a steel wire mesh screen with pores ranging from about 6,400 to about 38,000 microns, it being understood that other sizes and types of coarse-screening material may also be used for the upper portion 210 while still staying within the scope of the invention.

A debris inlet 212 at the end of the conduit 116 extends beyond the location of the partition 202 and into the rearward section 206. Because of the location of the debris inlet 212, and the velocity of the contaminated water and debris 114 being conveyed through conduit 116 (e.g., the flow rate may range from about 2,000 to about 8,000 feet/minute, depending upon the amount and density of the debris), most of the contaminated water and debris 114 enters the rearward section 206. The more dense and coarser debris 114 will either settle in the rearward section 206 due to the forces of gravity, or be retained therein by the coarse-screening portion 210. In either event, such coarser debris 114 will thereafter be essentially restricted from entering the forward section 204 by the substantially solid portion 208 of the partition 202. The contaminated water containing less dense and suspended debris 114, on the other hand, will flow through the upper coarse-screening portion 210 by the natural tendency of water to seek its own level, and into the forward section 204 to undergo the second stage of the filtration process.

In the preferred embodiment, there is a relief valve means (not illustrated) in the partition 202 which permits the water levels in the two sections 204 and 206 to come to equilibrium through seepage. Such equilibrium assures that the water level in the rearward section 206 need not rise above the solid portion 210 of the partition 202 for the contaminated water to undergo the second filtration process. Thus, such relief valve means permits the operating level of water in the system to vary considerably. The relief valve may be constructed by providing gaps between portions of the edges of the partition 202 and the walls of the debris compartment 118, and may also be provided by cutting holes of varying sizes (e.g., generally under about 5,000 microns) in the portion 208. In either event, the gaps or holes should not be so large as to detrimentally affect the structural integrity of the portion 208.

The second stage of filtration occurs in the forward section 204. The contaminated water is drawn through a filter 214 by the forces of gravity. Although other configurations are also possible, it is advantageous in the preferred embodiment for the filter 214 to be drum-shaped, i.e., a substantially cylindrical body 213 with caps 215 on both ends. (See FIG. 3). The circumferential surface 217 of the drum 214 is perforated. In the preferred embodiment, the perforations range from about 6,000 to about 15,000 microns wide by about 50,000 to about 75,000 microns long, and are spaced about 1,500 to about 8,000 microns apart; it is understood, however, that any other arrangement of perforations may be used without departing from the scope of the invention so long as the structural integrity of the drum 214 is maintained.

The drum 214 is surrounded by a fine filtration media 218. While stainless steel wire-woven cloth, with pore sizes ranging from about 50 to about 200 microns, can be advantageously used as the media 218 in the preferred embodiment, the present invention is not limited thereby and it should be understood that other media (such as synthetic woven materials or monofilament screens) can also be used.

Also, it is preferred that the media 218 be attached to the drum 214 in such a manner that it may be quickly and easily replaced. For example, in the preferred embodiment, one end of the media 218 is bolted to the drum 214. A shaft mount (not illustrated) is welded to this end, and a shaft (not illustrated) is attached, as by spot-welds if the media is stainless steel wire-woven cloth, to the other end of the media 218. The media 218 is wrapped around the drum 214, and the shaft is inserted into the shaft mount. The shaft is then cranked to tighten the media 218 around the drum 214. As one skilled in the art will appreciate, other attachment and media-tightening techniques may also be employed.

The contaminated water is filtered while being drawn through the media 218 and is then flowed through a conduit 220, a tube 222 and the hose 106 to the nozzle 112 by the positive displacement action of the pump 216 to continue the cleaning process described above. As discussed further below, the conduit 220 is preferably stationary and extends generally downwardly below the longitudinal axis of the drum 214 to maximize the water pressure above its open end in the drum 214 and to expand the operable water level range within the debris compartment 118.

As described above, clean water can also be supplied to the nozzle 112 from the clean water reservoir 108 via an outlet tube 224, the pump 216, the tube 222 and the hose 106. Therefore, either the clean water from the reservoir 108 or the filtered water from the forward section 204 can be drawn by the pump 216. Pumps such as positive displacement pump 216 are well known in the art and need not be further discussed here.

In addition, the conduit 220 is provided with a valve 226, and the tube 224 is provided with a valve 228. When the valve 226 is opened, and the valve 228 is closed, the process of recycling the reclaimed water is completed: the contaminated water from the sewer lateral 110 has been filtered and recycled to be utilized in the cleaning process. In addition, when the valve 228 is in the closed position and the valve 226 is open, the contaminated water is prevented from flowing into the clean water storage reservoir 108, thereby assuring that the contaminated water does not pollute the clean water reservoir 108. Preventing such pollution of the clean water is advantageous for the reasons discussed above with reference to the Flynn disclosure. Conversely, if the valve 226 were closed and the valve 228 opened, clean water from the reservoir 108 is available for use in cleaning the sewer.

Figure 3:
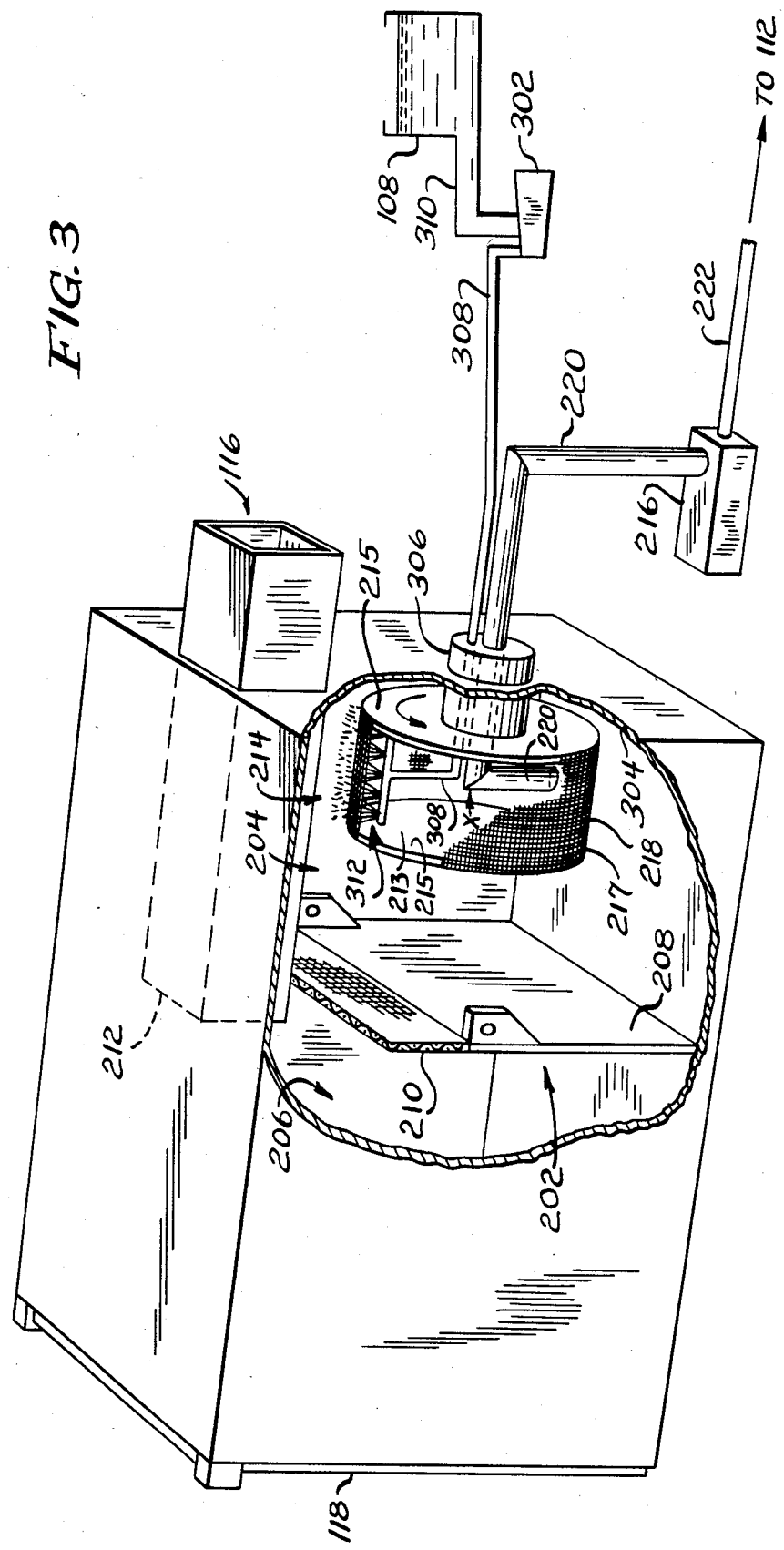
FIG. 3 illustrates the perforated drum of the present invention in relation to the water recycling process of the preferred embodiment of present invention.

In order for the process of the present invention to be most effective, the media 218 surrounding the drum 214 is continually cleaned. FIG. 3 illustrates how this cleaning is achieved in the preferred embodiment. Because the contaminated water within the forward section 204 may contain particles that will not pass through the media 218, some settling of the particles will likely occur in this section. Therefore, the drum 214 is mounted so as to be above any settling debris 114 which may interfere with its operation.

The media 218 on the drum 214 is cleaned as follows. The drum 214 is attached to the forward wall 304 of debris compartment 118 by a rotating joint 306. The rotating joint 306 is adapted to seal the contaminated water and debris 114 in the debris compartment 118; to permit the drum 214 to be rotated by an external drive means source (not shown) so that the drum 214 and the media 218 can be continually cleaned without interfering with the sewer cleaning operations; and to hold the conduit 220 and a cleaning conduit 308—which extend through the joint 306 into the drum 214—in a stationary fashion during the rotation of the drum 214 and the cleaning of the media 218. The joint 306 is connected to an external drive means (not shown) so that the drum 214 may be rotated. The drive means may comprise a gear arrangement connected to a motor, or a hand crank, and may include associated seals, bearings and the like which permit the joint 306 to rotate about its longitudinal axis without imparting any rotation to the conduits 220 and 308. In addition, the external drive means minimizes the wear of the components thereof, as well as enhances maintenance accessability and reduces corrosion.

The preferred embodiment of the present invention utilizes a small amount of clean water from the reservoir 108 (shown in FIG. 3 displaced from the location shown in FIG. 2 for clarity) to clean the rotating drum 214 and the media 218. Clean water from the reservoir 108 is drawn by a high-pressure pump 302 via the conduit 310, and is flowed to a set of cleaning nozzles 312 through the conduit 308 which is connected thereto. For convenience and ease of operation, the conduit 308 may be positioned within the bore of the conduit 220, with the head 309 of the conduit 308 extending through the conduit 220 at the location noted as "X" in FIG. 3. In the preferred embodiment, an auxillary, high-pressure pump 302, with a capacity of displacing from about 5 to about 20 gallons of water per minute at approximately 1400 to 2200 psi, is used to supply water to the nozzles 312. It is understood that other pumps may also be used.

The nozzles 312 then direct this high-pressure flow of clean water through the media 218 to dislodge, remove or loosen any particles that may be attached thereto. Although the preferred embodiment utilizes a plurality (e.g., five) of V-shaped nozzles 312 which spray at an angle ranging from approximately 50° to 80° each, and are spaced approximately 2 to 2½ inches apart, it is understood that other arrangements and types of nozzles 312 may be used so long as the nozzles are positioned to effectively spray the entire screen area of the media 218 adjacent the nozzles 312 as the drum 214 rotates. In the preferred embodiment, about 500 to about 600 square feet of the media 218 are cleaned per minute.

Due to the nature of the joint 306, the cleaning nozzles 312 are held stationary as the drum 214 is rotated to ensure all parts on the media 218 repeatedly pass through the high-pressure spray from the nozzles 312. Also, the high-pressure flow of water from the nozzles 312 preferably is directed through the media 218 at a point where the media 218 and the drum 214 rotate above the water level. Thus, maintaining the water level in the debris compartment 118 to be below or just at the tips of the nozzles 312 (as discussed below) substantially enhances the cleaning action because it takes considerably less force to displace the relatively lighter mass of air surrounding the media 218 rather than that of water, which would be necessary if the drum 214 were fully submerged. In the preferred embodiment, the drum 214 is of a sufficiently large diameter (e.g., approximately 25 to 40 inches) to rotate about its longitudinal axis with only a part thereof being submerged during rotation, thereby expanding the operable range of water levels in the debris compartment 118.

Thus, as described above, it is preferable to maintain the water level in the debris compartment 118 below the tips of the nozzles 312. As illustrated in FIG. 4, this can be achieved by providing a visual float 404 which is connected to a shaft 406. The shaft 406 is connected to a pivot joint 408 in a wall 410 of the debris compartment 118, with the shaft in turn being connected to a pointer 412 (see FIG. 1) positioned on the exterior of the debris compartment 118. Thus, when the operator observes the pointer 412 indicating that the water level is approaching the tips of the nozzles 312, he or she can commence withdrawing the reclaimed water, as discussed above, from the forward compartment 204 for use in the cleaning operation. An audible alarm device (not illustrated), triggered when the water level approaches the tips of the nozzles 312, can also be employed. Of course, it is understood that other water-level measuring techniques may be used.

The preferred embodiment thus employs clean water to clean the media 218 both to enhance the cleaning action and to extend the operable life-time of the media 218 and the nozzles 312. However, to save water, the contaminated water could instead be used to clean the media 218. In this alternative embodiment, which may achieve a cost reduction, the conduit 308 can be disconnected from the pump 302 and coupled to the conduit 222 at the outlet of the pump 216. The pump 216 would then supply water to both the nozzle 112 and nozzles 312. A valve means (not illustrated) located in the conduit 308 or in the conduit 222 could then be opened or closed to accordingly direct the water to either the sewer-cleaning nozzle 112 or the media-cleaning nozzles 312, or both.

Depending upon the amount of debris 114, it may be necessary, either during or after the cleaning operation, to remove the water and accumulated debris 114 from the debris compartment 118. This removal may be accomplished in a conventional manner, as by providing a door in the compartment for removal of the debris and water, or pneumatic or tipping means, such as shown in Shaddock, U.S. Pat. No. 3,658,589, discussed above.

While the invention has been illustrated and described as embodied in a method and apparatus for recycling reclaimed water into the sewer or catch basin cleaning process, it is not intended to be limited to the details shown, since various modifications and structural changes may be made without departing in any way from the spirit of the present invention. For example, while the invention has been described with reference to location of the nozzles 312 within the drum 214, other nozzle arrangements may also be used, such as by placing the nozzles on the exterior of the drum 214 and arranging them so that they tangentially spray the media 218.

Further, it will be understood that each of the elements described above, or two or more together, may also find a useful application in other types of construction differing from the type described above.

Without further analysis, the foregoing so fully reveals the gist of the present invention that others, by applying current knowledge, can readily adapt it for various applications without omitting features that, from the standpoint of the prior art, fairly constitute essential characteristics of the generic or specific aspects of this invention.

What is claimed is:

1. A method for using a vehicle for recycling water used to clean piping system associated with sewer laterals and catch basins, the vehicle having a debris-receiving container and a water reservoir for storing water, comprising the steps of:
    (a) injecting water from the water reservoir under pressure into the piping system to loosen the debris located therein;
    (b) pneumatically conveying the water and loosened debris from the piping system into said debris-receiving container;
    (c) drawing the water so conveyed through a fine filtration media located in a portion of said debris-receiving container to remove debris from such reclaimed water, thereby producing filtered reclaimed water; and
    (d) injecting said filtered reclaimed water into the piping system by by-passing entirely the water reservoir to continue the cleaning of the piping system.

2. The method as claimed in claim 1, further comprising the step of cleaning the fine filtration media by directing a stream of water at high pressure to the surface of said media to dislodge the debris adhering thereto.

3. The method as claimed in claim 2, further comprising the step of rotating the fine filtration media about its longtitudinal axis to permit such media to be cleaned by the high-pressure water spray emitted from a stationary nozzle means located adjacent the media at a point where the media rotates above the level of the water in the debris receiving container.

4. The method as claimed in claim 3, further comprising the step of filtering the coarser debris from the reclaimed water in said debris receiving container before the reclaimed water is filtered through the filtration media.

5. The invention as claimed in claim 2, wherein the water used to clean the fine filtration media is clean.

6. A vehicle for removing debris from piping systems associated with sewer laterals and catch basins, comprising: a motorized vehicle having a debris-receiving container with a first conduit extending from said container, said first conduit being adapted to be lowered into the piping systems, a water injection system means associated with said vehicle comprising a water reservoir for storing water, a flexible water hose with a nozzle on the leading end thereof, a first pump means for delivering water at high pressure through a second conduit to said hose and nozzle to propel said nozzle and hose through the piping system for loosening the debris contained therein and backwashing such debris, and a third conduit for delivering water from said water reservoir to said first pump means; a vacuuming means associated with said vehicle adapted to reclaim water from the piping system by conveying the loosened debris and water from the piping system through said first conduit and into said debris-receiving container; a filtering means located in said debris-receiving container for filtering the debris from the reclaimed water conveyed into said container by said vacuuming means; and a recycling means for flowing at high pressure the filtered reclaimed water into the piping system by by-passing entirely said water reservoir.

7. The invention as claimed in claim 6, wherein said debris-receiving container is partitioned into a forward compartment and a rearward compartment by a partition means comprised of a substantially solid lower portion and a coarse-screening upper portion, and wherein said first conduit is positioned such that the reclaimed water and debris being conveyed by said first conduit is deposited into said rearward compartment, with said partition means having a relief valve means to permit the reclaimed water from said rearward compartment to seep into said forward compartment so that the water levels in both of said compartments may come to equilibrium.

8. The invention as claimed in claim 7, wherein said filtering means is located in said forward compartment, and further comprises a substantially cylindrical drum having a perforated surface thereon to permit the reclaimed water to flow into said drum, with the surface of said drum being wrapped with a fine filtration media means adapted to filter out the debris from the reclaimed water as the reclaimed water is drawn through said drum.

9. The invention as claimed in claim 8, wherein said filtering means further comprises a rotating joint means attached through the front wall of said debris-receiving container and attached at one end thereof to said drum to rotate said drum about its longitudinal axis with the other end of said joint means attached to a drive means located externally to said debris-receiving container for rotating said rotating joint means; a spray cleaning means located within said drum; a second pump means in communication with said water reservoir through a fourth conduit for delivering water from said water reservoir at high pressure to said spray cleaning means through a fifth conduit extending through said rotating joint means; and a sixth conduit located within said drum and extending through said rotating joint means to withdraw the filtered reclaimed water from said drum and convey such water, by action of said first pump means, to said hose for use in the debris removing operation.

10. The invention as claimed in claim 9, wherein said rotating joint means seals the reclaimed water and debris contained in said debris-receiving container, and is adapted to permit the rotation of said drum while maintaining said fifth and sixth conduits in a stationary fashion.

11. The invention as claimed in claim 10, wherein said spray cleaning means is adapted to spray said filtration media means with high-pressure water at a location where said filtration media means is not submerged in the reclaimed water and debris contained in said forward compartment.

12. The invention as claimed in claim 10, wherein said fifth conduit communicates with said second conduit so as to permit the reclaimed water to be flowed to said spray cleaning means at high pressure from said first pump means.

13. The invention as claimed in claim 8, wherein the perforations on the surface of said drum range from about 6,000 to about 15,000 microns wide by about 50,000 to about 75,000 microns long, and are spaced about 1,500 to about 8,000 microns apart.

14. The invention as claimed in claim 8, wherein said fine filtration media means has pore sizes ranging from about 50 to about 200 microns.

15. The invention as claimed in claim 9, wherein said spray cleaning means comprises a plurality of V-shaped nozzles which each spray at an angle ranging from approximately 50° to 80° each and are spaced approximately 2.5 inches apart.

16. The invention as claimed in claim 9, wherein said second pump means has a capacity of displacing from about 5 to about 20 gallons per minute at approximately 1400 to 2200 psi.

17. The invention as claimed in claim 7, wherein the coarse-screening upper portion of said partition means has pore sizes ranging from about 6,400 to about 38,000 microns.

18. A method for recycling water used to clean piping systems associated with sewer laterals and catch basins, comprising the steps of:
(a) injecting water under pressure into the piping system to loosen the debris located therein;
(b) pneumatically conveying the water and loosened debris from the piping system into a debris compartment associated with a debris collection vehicle;
(c) drawing the water to conveyed through a fine filtration media located in a portion of said debris compartment to remove debris from such reclaimed water, thereby producing filtered reclaimed water;
(d) injecting said filtered reclaimed water into the piping system to continue the cleaning of the piping system;
(e) cleaning the fine filtration media by directing a stream of water at high pressure to the surface of said media to dislodge the debris adhering thereto; and
(f) rotating the fine filtration media about its longitudinal axis to permit such media to be cleaned by the high-pressure water spray emitted from a stationary nozzle means located adjacent to the media at a point where the media rotates above the level of the water in the debris compartment.

19. The method as claimed in claim 18, further comprising the step of filtering the coarser debris from the reclaimed water in said debris compartment before the reclaimed water is filtered through the filtration media.

20. The method as claimed in claim 18, wherein the water used to clean the fine filtration media is clean.

* * * * *